(12) United States Patent
Laksin et al.

(10) Patent No.: US 6,727,295 B2
(45) Date of Patent: Apr. 27, 2004

(54) ENERGY CURABLE GRAVURE INKS INCORPORATING GRAFTED PIGMENTS

(75) Inventors: Mikhail Laksin, Scotch Plains, NJ (US); Subhankar Chatterjee, Hampton, NJ (US); Russell J. Schwartz, Cincinnati, OH (US); Paul A. Merchak, Loveland, OH (US); Patrice Aurenty, Hoboken, NJ (US); Edward Stone, Morris Plains, NJ (US); Gordon Kotora, Clifton, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/794,371

(22) Filed: Feb. 27, 2001

(65) Prior Publication Data

US 2002/0068772 A1 Jun. 6, 2002

Related U.S. Application Data

(63) Continuation-in-part of application No. 09/198,113, filed on Nov. 23, 1998, now abandoned, which is a continuation-in-part of application No. 08/878,590, filed on Jun. 19, 1997, now abandoned.

(51) Int. Cl.$^7$ .......................... C09D 11/02; C08F 2/48; C08F 2/54; C08K 3/10
(52) U.S. Cl. .................. 523/160; 522/81; 522/170; 522/909
(58) Field of Search ................. 523/160, 161; 524/612; 106/31.27, 31.13, 31.6, 31.28; 522/909, 81, 146, 141, 142, 143, 135, 109, 170

(56) References Cited

U.S. PATENT DOCUMENTS

| | | | |
|---|---|---|---|
| 3,551,311 A | 12/1970 | Nass et al. ............... 204/159.8 |
| 3,661,614 A | 5/1972 | Bassemir et al. ............. 117/38 |
| 4,303,924 A | * 12/1981 | Young, Jr. .................. 347/102 |
| 4,468,255 A | 8/1984 | Schwartz et al. ....... 106/288 Q |
| 4,525,258 A | * 6/1985 | Watanabe et al. ............. 522/14 |
| 4,694,029 A | 9/1987 | Land .............................. 522/8 |
| 4,812,141 A | * 3/1989 | Baumgartner et al. ......... 8/506 |
| 4,946,508 A | 8/1990 | Schwartz et al. ........... 106/496 |
| 4,946,509 A | 8/1990 | Schwartz et al. ........... 106/496 |
| 4,978,969 A | 12/1990 | Chieng ....................... 346/1.1 |
| 5,024,698 A | 6/1991 | Schwartz et al. ............. 106/20 |
| 5,062,894 A | 11/1991 | Schwartz et al. ............. 106/23 |
| 5,085,697 A | 2/1992 | Kimura et al. ................ 106/20 |
| 5,145,997 A | 9/1992 | Schwartz et al. ........... 564/158 |
| 5,176,745 A | 1/1993 | Moore et al. |
| 5,177,200 A | 1/1993 | Kluger et al. ............... 540/122 |
| 5,232,812 A | * 8/1993 | Morrison et al. ........... 430/124 |
| 5,275,646 A | 1/1994 | Marshall et al. .......... 106/20 B |
| 5,318,808 A | 6/1994 | Crivello et al. ............. 427/517 |
| 5,380,769 A | 1/1995 | Titterington et al. ........ 523/161 |
| 5,429,841 A | 7/1995 | Batlaw et al. ............... 427/288 |
| 5,514,728 A | 5/1996 | Lamanna et al. ............. 522/31 |
| 5,535,673 A | * 7/1996 | Bocko et al. ................ 101/211 |
| 5,585,415 A | 12/1996 | Gorzalski et al. ............. 522/18 |
| 5,597,388 A | * 1/1997 | Fritzsche ....................... 8/444 |
| 5,641,346 A | 6/1997 | Mantell et al. ........... 106/31.58 |
| 5,656,336 A | 8/1997 | Kamen et al. ............... 427/511 |
| 5,658,964 A | 8/1997 | Amon et al. .................. 522/31 |
| 5,676,743 A | * 10/1997 | Lee .......................... 106/31.73 |
| 5,750,592 A | * 5/1998 | Shinozuka et al. .......... 523/161 |
| 5,766,268 A | 6/1998 | Bruhnke ........................ 8/647 |
| 5,919,846 A | * 7/1999 | Batlaw et al. ................. 524/83 |
| 5,958,169 A | * 9/1999 | Titterington et al. ........ 156/235 |
| 5,972,088 A | * 10/1999 | Krishnan et al. ........ 106/31.73 |
| 5,973,062 A | * 10/1999 | Harris et al. ................. 524/590 |

FOREIGN PATENT DOCUMENTS

| | | |
|---|---|---|
| DE | 195 0 968 A1 | 7/1996 |
| EP | 0 071 345 B1 | 6/1985 |
| WO | WO 92/13911 | 8/1992 |

OTHER PUBLICATIONS

Chandrasekhar, R., Water Based UV Curable Ink Jet Printing Fluid Containing Encapsulated Liquid Crystal, Journal of Radiation Curing, Oct. 1988. pp. 6–11.

Marshall, A.C., Sutty M., Miller, N, and Hudd A.L., The Use of UV Curable Prepolymers in Inkjet Inks. Radiation Curing: Science & Technology, 1992, pp. 132–146.

Monroe, B.M. and Weed, G.C., Photoinitiators for Free Radical Initiated Photoimaging Systems. Chem. Rev. 1993, pp. 435–448.

Noll, F.B. UV Curing Inks for Ink Jet Applications, Toxot (Science & Applications) pp. 1–7.

Noll, Fredrick B., UV Curing Inks for Ink Jet Applications, Toxot (Science & Applications) pp. 1–7, 1993.

* cited by examiner

Primary Examiner—Callie Shosho
(74) Attorney, Agent, or Firm—Sidney Persley

(57) ABSTRACT

Solvent-free, energy curable low viscosity gravure and non-conductive ink jet inks which contain a pigment; a rheological additive having the structure $P—(U—Y)_s$, wherein P is the residue of an organic pigment or dye, Y is a polyalkylene oxide moiety, U is a linking moiety covalently bonding Y to P and s is an integer from 1 to 3; and an energy curable liquid vehicle which may be a cationic, thermal cationic or a free radical initiated polymerization system, cured by actinic radiation; and optionally containing a photoinitiating system.

33 Claims, No Drawings

ENERGY CURABLE GRAVURE INKS INCORPORATING GRAFTED PIGMENTS

RELATION TO OTHER PATENT APPLICATIONS

This application is a continuation-in-part of a U.S. patent application Ser. No. 09/198,113 filed Nov. 23, 1998, now abandoned, which was a continuation-in-part of U.S. patent application Ser. No. 08/878,590 filed Jun. 19, 1997, also abandoned.

BACKGROUND OF THE INVENTION

1. Field of the Invention

This invention relates to low viscosity energy curable gravure and ink jet printing inks and methods for using same.

2. Description of Related Art

Low viscosity and good flow are the most important factors affecting liquid ink behavior and improved printability. These factors are particularly important for formulating inks for ink jet and gravure printing applications.

Schwartz et al. in U.S. Pat. No. 4,468,255, disclose rheology modifiers for arylide yellow pigment dispersions. The rheology modifiers which are derived from diarylide pigments improve the fluidity of non-aqueous arylide pigment dispersions prepared from either monoarylide or diarylide yellow pigments. Schwartz et al. in a series of patents (i.e., U.S. Pat. Nos. 4,946,508; 4,946,509; 5,024,698; and 5,062,894) have disclosed modified azo pigments for use in conventional, solvent and water based inks and coatings to function as rheology control agents. In each of these patents, Schwartz et al. modify an azo pigment (e.g., a diarylide pigment, a monoazo pigment, a disazo pyrazolone pigment and the like) by grafting a polyalkylene oxide to the pigment so that water based inks made from these pigment compositions exhibit high coloring strength, cleaner shades, lower rheology, and enhanced gloss compared with conventional water based inks.

To increase printing throughput, ultraviolet (UV) or electron beam (EB) curable inks have been developed that allow printers to reduce the solvent content of the ink. It is always a challenging task for a UV or EB curable liquid ink formulator to develop ink formulations with a viscosity low enough for improved flow, while at the same time maintaining other essential characteristics, such as to cure, adhesion, low odor, etc.

Traditional organic and inorganic pigments used in formulating energy curable liquid inks, are poorly dispersed in the vehicles used in the systems. As a result, poor pigment wetting leads to a thixotropic structure. If the inks are not subjected to high shear, the apparent viscosity will remain high and the ink will exhibit poor transfer resulting in poor printability. Flow additives have been tried, however, with limited success for different pigments. The situation becomes more critical in the case of cationic curable inks, where not all the pigments and additives can be used due to the presence of basic functionalities. In addition, some energy curable inks of the prior art contain fugitive solvent (such as water, alcohols and the like) as part of the vehicle to reduce viscosity, aid in pigment dispersion, and modify flow during printing. However, after printing but before curing, the fugitive solvent is typically removed to prevent interference with the curing process and to prevent it from having an adverse affect on the printed image. The curing delay required by solvent removal, as well as attendant unpleasant odors, are further undesirable limitations to printing. Furthermore, solvent removal is desirable for environmental reasons.

A UV-cured cationically polymerized printing ink is disclosed by Seng in Patent Application DE 195 00 968.1 for use in indirect letterpress printing or dry offset printing. Seng lists the differences between letterpress and flexographic printing and the list includes critical differences in ink viscosities. In particular, Seng discloses that printing inks used in flexographic printing have viscosities in the range of 0.01 to 2 cps and at 20° C. in the range of 3.0 to 100.0 cps, and more preferably in the range of 4.0 to 10 cps. Seng's inks are cationically polymerized and differ from the very high viscosity printing inks used in indirect letterpress printing in solvent content. While inks of this viscosity range are useful in high shear, indirect letterpress printing, such inks have high tack which causes them to be unsuitable for low shear applications such as flexography, which requires low tack inks.

U.S. Pat. No. 5,641,346, Mantell et al. teaches an ink jet ink that includes a colorant and a liquid component containing at least one of an epoxy and a vinyl ether. Water is dissolved in the liquid component. Preferably, the vinyl ether is ethylene glycol monovinyl ether. The ink jet recording process in Mantell et al. includes the steps of ejecting an ink jet ink from an orifice to form an image on a recording medium.

U.S. Pat. No. 5,275,646, Marshall et al. is directed to an energy curable conductive ink jet formulation patent disclosed a conductive ink and a method of ink jet printing with a conductive ink, containing a polar conductive material. The reference also teaches formulating non-conductive ink jet formulations, however, these formulations contain polymeric or further polymerizable material whose presence provides increased viscosity to the polymer blend. Though the patent states that the range of suitable polymers is vast, polyethylene oxide is not listed among the types of polymers that can be used (see col. 5, 11, 33–35). The '646 patent specification consistently states that in contrast to conductive ink, the viscosity of the patented non-conductive ink may be "somewhat higher, e.g. up to 40 or 50 cP at 25° C. (Col. 2, lines 25–26).

Although improvements have been made in energy curable cationic ink formulations, there continues to be a need for energy curable ink formulations (including free radical initiated curable formulations) which have a high color strength, cleaner shade and enhanced gloss but retain a very low viscosity as required by flexographic and ink jet printing.

SUMMARY OF THE INVENTION

In one aspect, the invention is an energy curable gravure ink comprising a pigment, a rheological additive having the structure:

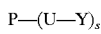

wherein P is the residue of an organic colorant, Y is a polyalkylene oxide moiety, U is a linking moiety covalently bonding Y to P and s is an integer from 1 to 3; and an energy curable liquid vehicle; wherein the ink is substantially free of fugitive solvent and has a viscosity ranging from about 3 cps to about 50 cps.

In another embodiment of this invention, this energy curable gravure ink further comprises a polymerization initiating system activatable by actinic radiation.

Another embodiment of this invention involves a method of gravure printing and curing the gravure ink composition comprising the steps of: preparing the energy curable gravure ink described supra; printing the ink onto a substrate surface to form an ink image; and subjecting the ink image to actinic radiation or thermal energy to form a cured ink image.

Another aspect of this invention involves an energy curable non-conductive ink jet ink comprising a pigment, a rheological additive having the structure:

P—(U—Y)$_s$ wherein P is the residue of an organic colorant, Y is a polyalkylene oxide moiety, U is a linking moiety covalently bonding Y to P and s is an integer from 1 to 3; and an energy curable liquid vehicle; wherein the ink is substantially free of fugitive solvent and has a viscosity ranging from about 3 cps to about 20 cps.

In another embodiment of this invention, this energy curable non-conductive ink jet ink further comprises a polymerization initiating system activatable by actinic radiation.

A further embodiment of this invention involves a method of ink jet printing and curing an ink jet ink composition comprising the steps of: preparing the energy curable non-conductive ink jet ink described supra; printing the ink onto a substrate surface to form an ink image; and subjecting the ink image to actinic radiation or thermal energy to form a cured ink image.

DETAILED DESCRIPTION OF THE INVENTION

The present invention is directed to a novel solvent-free, energy curable gravure and energy curable non-conductive ink jet printing inks having low to very low viscosities and their application. The term "energy curable or cured" as used herein, in reference to ink means an ink which can be cured, hardened, polymerized, or crosslinked by the action of actinic radiation such as UV or EB radiation and the like from a radiant energy source; or from a thermal energy source by heating with a conductive or radiant heat source such as a platen, an oven, infrared (IR), microwave, and the like.

The energy curable ink of this invention comprises a pigment composition and an energy curable liquid vehicle is substantially free of a fugitive solvent. The terms "substantially free of fugitive solvent" and "solvent-free", as used herein in reference to inks, means free of a liquid component (e.g., water, lower alcohols, alkanes, aromatics, aliphatics, ketones, acetates and the like) which, after printing, is evaporated, imbibed into a substrate surface, or both, and does not remain as an essential component of the cured ink. Further, these terms are not intended to exclude trace or residual solvents resulting from the manufacture of ink components prior to ink formulation.

The term "colorant", as used herein means an organic pigment or dyestuff. The energy curable liquid vehicle typically comprises one or more low molecular weight mono- or multi-functional monomers. For offset inks and other inks which require higher viscosities, a resin, a reactive oligomer or polymer may also be present. The inks of the present invention may be cured thermally or by actinic radiation sources, such as electron beams and the like; or photolytically cured by actinic radiation, such as UV radiation and the like, when a suitable initiating system is incorporated into the ink. The solvent-free, energy curable inks of this invention are more fully described in the following examples.

Pigment

The pigment is any organic pigment that can be employed for the coloration of conventional printing inks of the prior art. The pigment may also be carbon black. Pigments suitable for use in the present invention may be any conventional organic pigment such as: Pigment Yellow 1, Pigment Yellow 3, Pigment Yellow 12, Pigment Yellow 13, Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23, or carbon black, including Pigment Black 7 and the like.

Rheological Additive

The rheological additive is a polyalkylene oxide covalently bonded (i.e. grafted) to the residue of an organic colorant and has the structure P—(U—Y)$_s$, in which P is the residue of an organic colorant, Y is a polyalkylene oxide moiety containing about 4 to about 400 alkylene oxide repeat units, and U is a linking moiety covalently bonding Y to P and s is an integer from 1 to 3.

Typically, P is a residue of a pigment, such as, a residue of an azo pigment, phthalocyanine pigment, dioxazine pigment, quinacridone pigment, perylene pigment, perinone pigment or the like. Preferably, P is the residue of a diarylide pigment, monoazo pigment, disazo pyrazolone pigment, phthalocyanine pigment, or perylene pigment.

The polyalkylene oxide moiety, Y, may be the residue of any polyalkylene oxide such as an ethylene oxide polymer, an ethylene oxide/propylene oxide copolymer and the like. Preferably, Y is an alkylene oxide copolymer having the general formula:

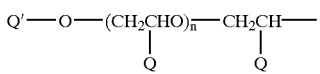

wherein n is about 4 to about 400 and more preferably is about 4 to about 60; Q is H, CH$_3$ or a combination thereof; and Q' is a C$_1$–C$_6$ alkyl moiety. The weight average molecular weight of the polyalkylene oxide moiety typically is between about 300 and 3,600; and preferably between about 1,000 and 3,000. The polyalkylene oxide moiety, Y, may be grafted to the residue of an organic colorant, P, through a linking moiety, U, which is preferably a covalent bond or multivalent moiety such as C$_1$–C$_6$ alkyl, —NHSO$_2$—, —O—, —CO—, —COO—, —N—, —CONH—, and the like. It is understood that the particular linking moiety employed will be determined by those skilled in the art depending on the nature of P.

Combinations of pigment and rheological additive particularly useful in the solvent free energy curable inks of the invention are described in U.S. Pat. Nos. 4,946,508; 4,946, 509; 5,024,698; and 5,062,894; each of which is incorporated herein by reference.

In particular, Schwartz et al, U.S. Pat. No. 4,946,508 discloses disazo pyrazolone compositions which contain said rheological additives and their method of manufacture. Such disazo pyrazolone pigment compositions have the general formula:

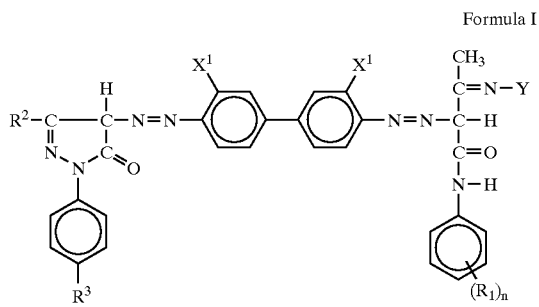

Formula I wherein Y is the polyalkylene oxide moiety; $R^1$ is H, $CH_3$, $OCH_3$, $OCH_2CH_3$ or Cl; n is selected from an integer from 1 to 5; $R^2$ is $CH_3$ or $COOCH_2CH_3$; $R^3$ is H or $CH_3$; and $X^1$ is Cl or $OCH_3$.

U.S. Pat. No. 4,946,509, Schwartz et al discloses azomethine compositions and their method of manufacture. Such azomethine pigment compositions have the general formula:

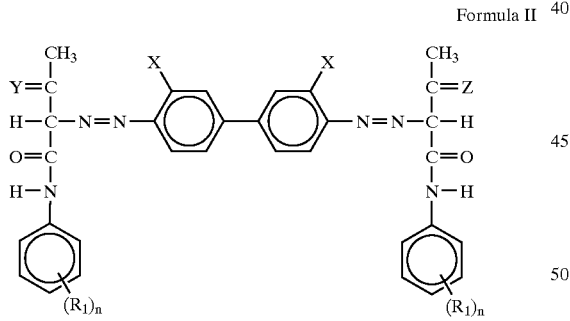

Formula II wherein Y is the polyalkylene oxide moiety containing about 4 to about 200 groups; R and $R^1$ are independently selected from the group consisting of H, $CH_3$, $OCH_3$, $OCH_2CH_3$ and Cl; n is selected from an integer from 1 to 5; X is selected from the group consisting of Cl, CH3, and OCH3; and Z is selected from 0 and N—Y.

U.S. Pat. No. 5,024,698, Schwartz et al discloses monoazomethine compositions and their method of manufacture. Such monoazomethine pigments have the general formula:

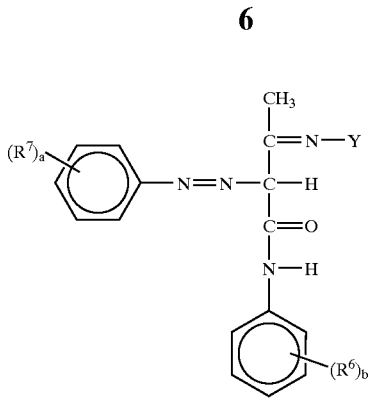

Formula III wherein Y is the polyalkylene oxide moiety; $R^6$ is independently selected from the group consisting of Cl, $OCH_3$, $CH_3$, $OC_2H_5$, $C_2H_5$, and $CONH_2$; $R^7$ is independently selected from the group consisting of Cl, $OCH_3$, $CH_3$, $NO_2$, $OC_2H_5$, $C_2H_5$, $CONH_2$, $SO_3H$, OH and COOH; and a and b are independently selected from integers 0 to 5.

U.S. Pat. No. 5,062,894, Schwartz et al discloses diarylide compositions and their method of manufacture. Such diarylide pigment compositions have the general formula:

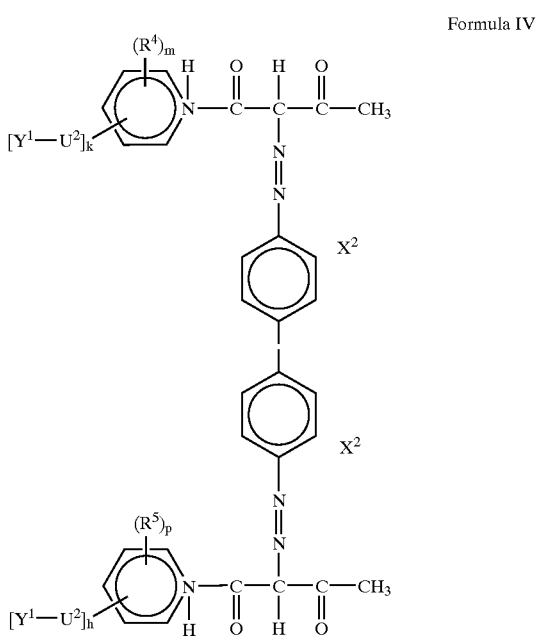

Formula IV wherein $R^4$ and $R^5$ are independently selected from the group consisting Of $C_1$–$C_4$ alkyl, $C_1$–$C_4$ alkoxy, and halogen; m and p are independently selected from integers of 0 to 5; $X^2$ is selected from the group consisting of Cl, $CH_3$, and $OCH_3$; $U^2$ comprises a divalent bridging moiety selected from the group consisting of $C_1$–$C_6$ alkyl, —$NHSO_2$—, —O—, —CO—, —COO—, and —CONH—; $Y^1$ comprises the polyalkylene oxide moiety having a number average molecular weight of about 200 to 10,000; and k and 1 are independently selected from integers 0 or 1, with the proviso that for at least 50 wt. % of the composition, k and 1 are both 0, and for at least 3 wt. % of the composition k and/or 1 are 1.

Other rheological additives particularly useful in the energy curable inks of this invention, include phthalocyanine compositions having the P—U—Y structure in which P, is the residue of a copper phthalocyanine pigment and wherein the linking moiety, U, is —NHSO$_2$—which joins P to Y. Such copper phthalocyanine based rheological additives have the general formula:

Formula V

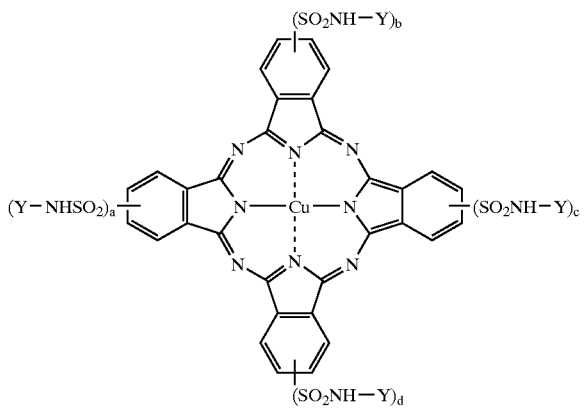

wherein Y is a polyalkylene oxide moiety which has the general formula:

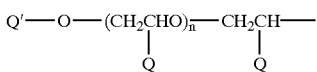

wherein n is about 4 to about 400, and a, b, c and d are integers independently from 0 to 4, provided at least one of them is 1; Q is selected from H, CH$_3$ or a combination thereof; and Q' is a C$_1$–C$_6$ alkyl moiety.

The rheological additive used in this invention may be prepared by any conventional method. Illustrative methods for preparing the pigments with the rheological additives described herein are disclosed in U.S. Pat. Nos. 4,946,508; 4,946,509; 5,024,698; and 5,062,894 and in the Examples.

The pigment compositions used in this invention typically contain a minor portion of said rheological additive which serves to reduce the viscosity of the composition and a major portion of the conventional pigment. The residue of the organic colorant that is contained in the rheological additive does not need to be of the same type as the pigment of the ink formulation. For example, the additive of Formula V may be utilized with Pigment Violet 23 or Pigment Black 7.

An advantage of the preparation methods disclosed in the Schwartz et al. patents supra, is that a blend of the colorant additive and the pigment is produced directly, and may be used without further blending. To produce printing inks with a desired hue, a separate pigment may be added which is distinct from the pigment and rheological additive. Methods of effecting a desired hue from precursor pigments are well known to the ink formulator and are illustrated in the examples.

Energy Curable Liquid Vehicle

The solvent-free, energy curable ink of this invention contains as the third essential component a quantity of an energy curable liquid vehicle which is substantially free of fugitive solvent. The quantity of liquid vehicle employed is an amount sufficient to make up 100% of the ink weight when taken together with other ink components. The radiation curable liquid vehicle typically comprises one or more low molecular weight mono-functional or multi-functional monomers. For offset inks and other inks which require higher viscosities, a resin, a reactive oligomer or polymer may also be present. These components may react with the monomers upon curing. The energy curable liquid vehicle is characterized in that it is curable to a solid by exposure to energy from a radiant or thermal energy source as described supra. The liquid vehicle may be cured to a solid by exposure to energy, such as exposure to high energy electrons from an electron beam source. Alternatively, curing of the liquid vehicle may be initiated by energy activation of a polymerization initiating system (e.g. by UV radiation) as will be described in detail hereinbelow. In this context, a polymerization initiating system may be considered an optional component of the energy curable liquid vehicle. The liquid vehicle may be a ring opening polymerizable composition, a free radical addition polymerizable composition, or by a combination of ring opening and free radical polymerization. In either composition, the liquid vehicle is cured or hardened by polymerizing and/or crosslinking, at least the reactive monomers of the liquid vehicle. In order to reduce environmental contamination and maintain formulation integrity, the liquid vehicle is typically formulated with components having low volatility under ambient printing conditions.

When the liquid vehicle is a ring opening polymerizable composition, upon energy initiation it forms a polymer typically bound by ester, or ether linkages.

In a preferred embodiment of the invention the polymerizable composition is a cationic polymerizable system comprising one or more mono-functional or multi functional epoxides. The liquid vehicles typically contain at least one cycloaliphatic epoxide. Examples of such cycloaliphatic epoxides are adducts of epoxides and hydroxyl components such as glycols, polyols, or vinyl ether, such as 3,4-epoxycyclohexylmethyl 3,4-epoxy-cyclohexane carboxylate; bis (3,4-epoxy-cyclohexyl-methyl)adipate; limonene monoepoxide; limonene diepoxide; diglycidyl ester of hexahydrophthalic acid; 1-vinyl-3,4-epoxycyclohexane; epoxidated dicyclopentyl alcohol; or a mixture thereof. A preferred cycloaliphatic epoxides of this type is 3,4-epoxycyclohexylmethyl 3,4-epoxy-cyclo-hexylcarboxylate; 1,3-bis(2-(7-oxabicyclo(4.1.0)hepta-3-yl)ethyl)-1,1,3,3-tetramethyldisiloxane. In addition to the cycloaliphatic epoxides there may be one or more noncycloaliphatic epoxides, such as di- or tri-glycidyl ether, alkoxylated bisphenol A, 1,6-hexane diol, glycerol; neopentylglycol; or trimethylolpropane. The epoxy diluent likewise may be diglycidyl ether of bisphenol A; an alpha-olefin epoxide, a Novalac epoxide, epoxidated linseed oil, soy oil; epoxidated polybutadiene; 1,2-epoxydecane; caprolactone triol; glycidyl ether; alkyl glycidylether; epoxidated silanes; glycidoxy-methoxy silane; and glycidoxy-ethoxy silane; 2-ethylhexylglycidyl ether. In such epoxy compositions, the ink typically contains a cationic initiating system activatable by actinic radiation as will be described hereinbelow. A preferred epoxy diluent is 2-ethylhexylglycidyl ether. In such epoxy compositions, the ink typically contains a cationic initiating system activatable by actinic radiation as will be described hereinbelow.

When the energy curable liquid vehicle is a free radical addition polymerizable composition, the vehicle comprises a liquid compound having terminal ethylenic unsaturation.

Typically, the liquid vehicle is a free radical addition polymerizable system comprising an ethylenically unsaturated mono- or multi-functional monomer. The monomer is a lower molecular weight ethylenically unsaturated compound which forms a polymer directly upon initiation by free radicals generated by absorbed energy. In some formulations an oligomeric or polymeric component which can be further polymerized may also be present. In such cases the further polymerizable material will be soluble in, or dispersible in the monomer vehicle.

Typically, the monomeric compounds have one, two, or more terminal ethylenically unsaturated groups. Representative of such monomeric compounds are: N-vinyl pyrrolidinone; dipropylene glycol diacrylate; tripropylene glycol diacrylate; butanediol diacrylate; hexanediol diacrylate; trimethylol propane triacrylate; ethoxylated trimethylol propane triacrylate; glycerol-propoxy triacrylate; pentaerythritrol triacrylate; dipropylene glycol dimethacrylate; tripropylene glycol dimethacrylate; butanediol dimethacrylate; hexanediol dimethacrylate; trimethylol propane trimethacrylate; di-(3-methacryloxy-2-hydroxypropyl ether) of bisphenol-A; di(2methacryloxyethyl ether) of bisphenol-A; di-(3-acryloxy-2-hydroxypropyl ether) of bisphenol-A; di(2-acryloxyethyl ether) of bisphenol-A; and the like.

To achieve the desired ink viscosity and crosslinking properties, typically the monomer composition contains a combination of multifunctional acrylic monomers along with a monomer containing a single terminal ethylenic group, as illustrated in the examples which follow.

When the inks of this invention contain an oligomeric or polymeric material, said materials typically possess ethylenic unsaturation which can react with the ethyl-enically unsaturated monomers. Representative of such oligomers are acrylated epoxy resins; acrylated polyurethanes; acrylated polyesters; and the like.

The inks of the present invention may also contain a preformed polymer such as an acrylic polymer or copolymer of $C_1$–$C_4$ alkyl acrylates or methacrylates, or acrylic or methacrylic acid, vinyl polymers and copolymers such as polyvinyl chloride, polyvinyl acetate, polyvinyl alcohol, polyvinylpyrolidone, cellulosic polymers and copolymers; and the like.

Polymerization Initiating System

Unless the ink is formulated specifically for use with EB curing, it will contain a polymerization initiating system activatable by actinic radiation, such as UV or thermal radiation. Such a photoinitiator system has one or more compounds that directly furnish cationsor free radicals when activated by actinic radiation.

UV cationic polymerization initiating systems typically are used to initiate ring opening polymerization in systems such as the epoxy compositions described herein. Such cationic initiating systems include all substances which liberate Lewis acids or Broensted acids upon exposure to actinic radiation. Cationic photoinitiating systems which are particularly useful in the energy curable inks of this invention are arylsulfonium salts, especially the triarylsulfonium salt such as triarylsulfonium phosphate, triarylsulfonium antimonate, triphenylsulfonium hexafluorophosphate, and diarylsulfonium salt; and aryl-iodonium salts, such as diaryliodonium hexafluoroantimonate, bisdodecyldiphenyliodonium hexafluoroantiminoate, and the like. Such cationic photoinitiators may be used individually or in combination to effect suitable curing of the ink. Preferred are diaryliodonium hexafluoroantimonate and ($n^5$-2,4-cyclopentadien1-yl) [(1,2,3,4,5,6-n) (1-methylethyl)benzene]-iron$^+$-hexafluorophosphate(−1).

In thermal cationic polymerization initiating systems such as the thermal cationic inks described herein, a blocked acid is typically used because it does not initiate the ring opening polymerization of epoxies until it is unblocked. Thermal irradiation unblocks the acid and generates a strong acid, which starts the epoxy ring opening polymerization. Some examples of "blocked" acids are Nacure TLC 1412 (King Industries), FC-122 and FC-520 (Available from 3M, St. Paul, Minn.), and CP-66 (Available from Ciba, White Plains, N.Y.).

Free radical polymerization initiating systems may also be used and typically require irradiation of a photoinitiator to produce free radicals that initiate polymerization. A wide variety of these photoinitiators may be used in the energy curable inks of this invention. A few are described, for example, by B. M. Monroe and G. C.Weed in *Photoinitiators for Free-Radical-Initiated Photo-Imaging Systems*, Chem. Rev. 93, pp. 435–48 (1993), incorporated herein by reference. The reference describes the use of thioxanthone, ethyl 4-(dimethyl-amino) benzoate, alpha amino acetophenone, and Michler's ketone as photoinitiators.

Adjuvants

The radiation curable inks of this invention may optionally contain the usual adjuvants to adjust ink flow, surface tension, surface penetration and gloss of the cured printed ink. Such adjuvants contained in the ink typically are a surface active agent, a wax, a humectant or a combination thereof. These adjuvants may function as leveling agents, wetting agents, dispersants, defrothers or deareators, or additional adjuvants may be added to provide a specific function. Preferred are isopropyl adjuvants include fluorocarbon surfactants such as FC430, available from the 3M Company; silicones such as DC57, available from the Dow Chemical Corporation; polyethylene wax; polyamide wax; polytetrafluoroethylene wax; and the like.

Printing Ink Formulation

The solvent-free, energy curable ink contains as its essential ingredients typically about 2 to about 15% by weight of pigment, about 0.1 to about 10% by weight of rheological additive and the balance being the liquid energy curable vehicle which is substantially free of a fugitive solvent. The energy curable liquid vehicle typically comprises, one or more low molecular weight mono-functional or multi-functional monomers. For offset inks and other inks which require higher viscosities (>1,000 cps), a resin, a reactive oligomer or polymer may also be present. In addition to the essential ingredients the energy curable ink may also contain up to about 6% by weight of polymerization initiating system activatable by actinic radiation; and up to about 10% or less by weight of a surface active agent, a wax, humectant or combination thereof.

The primary advantage offered by the solvent-free, energy curable inks of this invention are that the rheology may be readily adjusted to provide an ink having a decreased viscosity anywhere between about 3 cps to about 200 cps, preferably about 8 cps to about 20 cps (@240 s$^{-1}$ and 25° C.) for the energy curable gravure inks described herein and about 3 cps to about 25 cps, preferably about 3 cps to about 15 cps (@240 s$^{-1}$ and 25° C.) for the energy curable non-conductive ink jet inks described herein, simply by adjusting the ratio of the various types of monomer component, and/or by adjusting the ratio of pigment and viscosity reducing rheological additive to liquid vehicle; and/or by adjusting both ratios. The combination of pigment and rheological additive as described herein produces very fine or sub-micron pigment particle sizes that do not clog ink jet nozzles. In addition, these sub-micron particle sizes allow viscosities suitable for ink jet printing to be achieved.

The ink may be prepared by any conventional mixing and milling method typically used for preparing printing inks. Typically, the pigment and rheological additive are mixed with the liquid vehicle then milled. After milling additional liquid vehicle and any desirable adjuvants are optionally added and mixed to produce the energy curable ink. As indicated the above mentioned ratios are adjusted to achieve a printing ink with the desired viscosity, flow, color density, and curing characteristics. The ink formulation process is more fully described in the examples.

Printing Ink Conductivity

The printing ink of the present invention typically has conductivity on the order of $10^6$ ohms/cm because it does not contain polar conductive material. The conductivity of two typical ink of the invention was measured at $7.7 \times 10^6$ and $8.3 \times 10^6$ ohms/cm. The first ink contained 15% (by weight) Cyracure® 6105, 5% Modified Pigment Black 7, 75% Limonene Dioxide, and 5% UVI 6974. The second ink contained 11.9% Cyracure® 6105, 5.1% Modified Pigment Phthalocyanine Blue 15:4, 78% Limonene Dioxide, and 15% UVI 6974. The high ohms values mean that the present inks have a high resistance and therefore do not conduct electricity.

Method of Printing and Curing

This invention is also directed to a method of printing and curing an ink image comprising the steps of: preparing solvent-free energy curable inks as described supra; (b) printing the inks on a substrate surface to form an image; and (c) subjecting the image to actinic radiation or thermal energy to form a cured ink image.

The method is particularly directed to printing operations requiring low viscosity inks such gravure and ink jet printing. It is understood, however, that any suitable printing and curing means may be used to print and cure the solvent-free energy curable ink of this invention. Such suitable means include but are not limited to flexographic printing, equipped with thermal UV and/or EB curing stations which follow the printing station. Thus when the energy curable ink is free of a photoinitiator it may be cured by actinic radiation which is a beam of electrons. Alternatively, when the energy curable ink contains a polymerization initiating system, it may be cured by actinic radiation which is UV radiation. The printed energy curable ink containing a polymerization initiating system may be initially subjected to UV radiation and subsequently to a beam of electrons or thermal energy to complete the cure. As used herein, thermal energy is intended to include radiant energy such infrared or microwave energy and the like; or conductive thermal energy such as that produced by a heated platen or hot air oven, for example.

The following examples illustrate specific aspects of the present invention and are not to limit the scope thereof in any respect and should not be so construed. In the following examples all percentages provided are in volume percent unless otherwise noted.

EXAMPLE 1

An energy curable, cationic ink formulation was formulated using a modified Pigment Blue 15.4 composition containing copper phthalocyanine blue pigment and rheological additive.

A rheological additive was prepared by charging a presscake, containing 210 parts by weight of copper phthalocyanine sulfonyl chloride (which may be prepared by any conventional method) into a mixture of 692 parts by weight of a primary amine-terminated poly (ethylene oxide/propylene oxide) (5/95) copolymer having a number average molecular weight of approximately 2,000 (available as XTJ 507 from the Huntsman Corporation) and 66 parts by weight of sodium carbonate and mixed. The final reaction mixture was then heated to 80–90° C. under vacuum to remove water and produce the copper phthalocyanine additive.

The modified Pigment Blue 15.4 composition was prepared by combining 12% by weight of the copper phthalocyanine derived rheological additive where P is the residue of copper phthalocyanine with 79% by weight of conventional Pigment Blue 15.4 during the attrition process step of the conventional pigment.

The energy curable, cationic ink was formulated from the following components.

| COMPONENTS | WEIGHT % |
|---|---|
| Cyracure ® 6110[a] | 15 |
| Modified Pigment Blue 15.4 | 5 |
| CD 1012[b] | 2 |
| Irgacure ® 261[f] | .5 |
| DVE 3[g] | 76 |
| PE wax[d] | 1 |
| DC 57[e] | .5 |

[f]Irgacure ® 261, available from the Ciba Corporation, is $\{n^5\text{-}2,4\text{-}$cyclopentadien-1-yl) [(1,2,3,4,5,6-N) (1-methyl ethyl)benzene I-iron-hexafluorophosphate; and
[g]DVE, available from the GAF Corporation, is triethyleneglycol divinyl ether.

The Cyracure® 6110 and the modified Pigment Blue 15.4 were mixed at high speed (about 2000 rpm) with a Cowles blade and then processed through a media mill containing 1 mm size media. After processing, the remaining components were added and the viscosity of the two inks were measured.

| PIGMENT | VISCOSITY @ 25° C. |
|---|---|
| Modified PB-15.4 | 20 ± 5 cps at 240 s-1 |
| Conventional PB-15.4 | 100 ± 20 cps at 240 s-1 |

Printing runs were carried out with a gravure hand-proofer from Pamarco Inc. The major elements of the gravure hand-proofer are: a 300 line/inch (118 line/cm) anilox roller; and a doctor blade assembly for regulating the ink supplied to the anilox roller. The printed samples were passed through a UV curing unit from R.P.G. Industries having a lamp with an output of 400 Watts/inch in the UV spectral region and a cylindrical reflector. The substrate which was printed was the polyester label film from Fasson. The printing speed was about 1 m/sec (200 ft./min.) Using modified Pigment Blue 15.4 ink composition, a uniform ink film was applied to the substrate with the hand proofer and cured with this curing unit. A cured uniform ink film was likewise printed using conventional Pigment Blue 15.4 ink composition.

Color density and gloss measurements as described in Example 1 were carried out with the modified and the conventional Pigment Blue 15.4 prints. The assessed quality using the two ink formulations were:

| PIGMENT | COLOR DENSITY | GLOSS 60° |
|---|---|---|
| Modified PB-15.4 | 1.4 | 90 |
| Conventional PB-15.4 | 1.1 | 70 |

The ink containing modified Pigment Blue 15.4 demonstrates more uniform lay and less reticulation than the ink containing the conventional pigment, which results in higher density and better gloss of the print.

EXAMPLE 2

An energy curable, cationic ink formulation was formulated using a modified Pigment Violet 23 composition containing Pigment Violet 23 and rheological.

Modified Pigment Violet 23 composition was prepared by combining 15% by weight of the copper phthalocyanine derived rheological additives of Examole 1 with 85% by weight of conventional Pigment Violet 23 during the attrition process step of the conventional pigment.

The energy curable, cationic ink was formulated from the following componets.

| COMPONENTS | WEIGHT % |
|---|---|
| Cyracure ® 6110[a] | 26 |
| Modified Pigment Violet 23 | 8 |
| E6250[h] | 60 |
| CD 1012[b] | 5 |
| PE wax[d] | 1 |
| DC 57[e] | .5 |

[h]E6250, available from the Hüls America Corporation, is (2-(3,4-epoxycyclo hexyl)-ethyltrimethoxysilane).

The Cyracure® 6110 and the modified Pigment Violet 23 were mixed at high speed (about 1000 rpm) with a Cowels blade and then processed through a media mill containing 1 rvm size media. After Processing the remaining componets were added and the viscosity of the two inks were measured.

| PIGMENT | VISCOSITY @ 25° C. |
|---|---|
| Modified PV-23 | 20 ± 5 cps at 240 s$^{-1}$ |
| Conventional PV-23 | 150 ± 50 cps at 240 s$^{-1}$ |

Printing runs, as describe in Example 1, were carried out with the modified Pigment Violet 23 and compared to conventional Pigment Violet 23. Color density and gloss measurements were carried out with the modified and conventional Pigment Violet 23 prints. The assessed quality using the two ink formulations were:

| PIGMENT | COLOR DENSITY | GLOSS 60° |
|---|---|---|
| Modified PV-23 | 2.34 | 75 |
| Conventional PV-23 | 1.88 | 46 |

EXAMPLE 3

A UV curable ink jet ink was formulated using a modified Pigment Black 7 prepared by dry mixing 19 wt. % of a copper phthalocyanine derived rheological additive prepared as described in Example 1 with 81 wt. % of conventional Pigment Black 7 and the following components:

| Components | Weight % |
|---|---|
| Cyracure ® 6105[a] | 15 |
| Modified Pigment Black 7 | 5 |
| Limonene Dioxide | 75 |
| UVI 6974[b] | 5 |

[a]Cyracure 6105, available from the Union Carbide Corporation, is 3,4epoxycyclohexylmethyl-3,4 epoxycyclohexylcarboxylate; and
[b]UVI 6974, available from the Union Carbide Corporation, is triarylsulphonium hexafluoroantimonate.

The Cyracure 6105 and the modified pigment Black 7 were mixed together in a ratio of 3:1. After processing, the remaining components were added slowly at low mixing speed.

The resulting ink was subjected to a set of physical tests, i.e. viscosity measurements at 25° C. and 100 s$^{-1}$, a thermal stability test and optical microscopy for pigment dispersion. The thermal stability test consists of a rheological profile (viscosity vs. time) of the ink, obtained by shearing the sample constantly at 100 s$^{-1}$ and at temperatures from 25° C. to 80° C. and back to 25° C. If the viscosity-temperature profile on the upward curve and the downward curve match exactly. Thermal stability is good. Any other behavior is an indication of irreversible pigment flocculation.

The 25° C. viscosity at 100 s$^{-1}$ was 14 mpa·s, which is fine for several ink jet heads. The thermal stability was good. Optical microscopy showed a very fine dispersion with no particles above one micron.

A draw down was done on coated paper, aluminum foil and on a corona treated polyethylene film, with a #3 Meyer Rod. The resulting ink lays were cured at 200 fpm, with 2 lamps having an output of 300 Watts/inch in the UV spectral region and a cylindrical reflector. The ink layers were fully cured and exhibited good adhesion on both substrates, good resistance to water and good scratch resistance.

The ink jet ink was filled in the DOD printer head and jetted at room temperature onto a coated paper, a film and aluminum foil. The ink jetted fine and dot addressability was excellent. The resulting printed substrates were cured under the same conditions as the draw downs and exhibited the same resistance properties.

EXAMPLE 4

A UV curable ink jet ink formulation was formulated using a modified Pigment Blue 15:4 composition as prepared in Example 1. The following components were then added:

| Components | Weight % |
|---|---|
| Cyracure ® 6105[a] | 11.9 |
| Modified Pigment Phthalocyanine Blue 15:4 | 5.1 |
| Limonene Dioxide | 78 |
| UVI 6974[b] | 15 |

[a]Cyracure 6105, available from the Union Carbide Corporation, is 3,4epoxycyclohexylmethyl-3,4 epoxycyclohexylcarboxylate; and
[b]UVI 6974, available from the Union Carbide Corporation, is triarylsulphonium hexafluoroantimonate.

The Cyracure 6105 and the modified Pigment Phthalocyanine Blue 15:4 were mixed together in a ratio of 7:3. After processing, the remaining components were added slowly at low mixing speed. The resulting ink was subjected to the same set of physical tests as in Example3.

The 25° C. viscosity at 100 s$^{-1}$ was 13 mPa·s, which is fine for several ink jet heads. The thermal stability was good. Optical microscopy showed a very fine dispersion with no particles above one micron.

Draw downs were done on aluminum foil, corona treated polyethylene and polypropylene films, a chemically treated polyester film, a PVDC coated cellophane and on metallized polypropylene film, with a #3 Meyer Rod. The ink lays were cured at 200 fpm, with 2 lamps having an output of 300 Watts/inch in the UV spectral region and a cylindrical reflector. The cured ink lays exhibited good adhesion on every substrate cited except on chemically treated polyester film, good resistance to water on every substrate except on corona treated polyethylene film and good scratch resistance on every substrate except on metallized polypropylene film.

EXAMPLE 5

A UV curable ink jet ink formulation was formulated using a modified Pigment Black 7 composition as described in Example 3, and the following components:

| Components | Weight % |
|---|---|
| Siloxane S-200[a] | 14 |
| Modified Pigment Black 7 | 6 |
| Z-6040[b] | 75 |
| UVI 6974[c] | 5 |

[a]Siloxane S-200, experimental product available from Rhone-Poulenc, 1,3Bis(2-(7-oxabicyclo(4.1.0) hept-3-yl)ethyl)-1,1,3,3-tetramethyldisiloxane;
[b]Z-6040, available from Dow Corning, is glycidoxy-methoxy silane; and
[c]UVI 6974, available from the Union Carbide Corporation, is triarylsulphonium hexafluoroantimonate.

The Siloxane S-200 and the modified Pigment Black 7 were mixed together in a ratio of 4:6. After processing, the remaining components were added slowly at a low mixing speed. The resulting ink was subjected to the same set of physical tests as in Example 3.

The 25° C. viscosity at 100 s−1 was 5 mPa·s, which is fine for several ink jet heads. The thermal stability was good. Optical microscopy showed a very fine dispersion with no particles above one micron.

Draw downs were done on aluminum foil, corona treated polyethylene and polypropylene films, a chemically treated polyester film, a PVDC coated cellophane and on metallized polypropylene film, with a #3 Meyer Rod. The resulting ink lays were cured at 200 fpm, with 2 lamps having an output of 300 Watts/inch in the UV spectral region and a cylindrical reflectors The cured ink lays exhibited good adhesion on every substrate cited above except on chemically treated polyester film, good resistance to water on every substrate except on metallized polypropylene film where it was fair, and good scratch resistance on every substrate except on metallized polypropylene film where it was fair.

The ink jet ink was filled in the DOD printer head and jetted at room temperature onto a coated paper, a film and aluminum foil. The ink jetted fine and dot addressability was excellent. The resulting printed substrates were cured under the same conditions as the draw downs and exhibited the same resistance properties.

EXAMPLE 6

A UV curable ink jet ink formulation was formulated using a modified Pigment Black 7 composition as described in Example 3, and the following components:

| Components | Weight % |
|---|---|
| Cyracure ® 6105[a] | 18.6 |
| Modified Pigment Black 7 | 5.9 |
| Z-6040[b] | 70.5 |
| UVI 6974[c] | 5 |

[a]Cyracure 6105, available from the Union Carbide Corporation, is 3,4epoxycyclohexylmethyl-3,4 epoxycyclohexylcarboxylate;
[b]Z-6040, available from Dow Corning, is glycidoxy-methoxy silane; and
[c]UVI 6974, available from the Union Carbide Corporation, is triarylsulphonium hexafluoroantimonate.

The Cyracure 6105 and the modified pigment Black 7 were mixed together in a ratio of 4:6. After processing, the remaining components were added slowly at slow mixing speed. The resulting ink was subjected to the same set of physical tests as in Example 3.

The 25° C. viscosity at 100 s$^{-1}$ was 8.5 mpa·s, which is fine for several Ink Jet heads. The thermal stability was good. Optical microscopy showed a very fine dispersion with no particles above one micron.

Draw downs were done on aluminum foil, corona treated polyethylene atid polypropylene films, a chemically treated polyester film, a PVDC coated cellophane and on metallized polypropylene film, with #3 Meyer Rod. The resulting ink lays were cured at 140 fpm, with 2 lamps having an output of 300 Watts/inch in the UV spectral region and a cylindrical reflector. The cured ink lays exhibited good adhesion on every substrate cited above except on chemically treated polyester film where it was poor, good resistance to water on every substrate except on metallized polypropylene film where it was fair to poor, and good scratch resistance on every substrate except on metallized polypropylene film where it was fair to poor.

EXAMPLE 7

A UV curable ink jet ink formulation was formulated using a modified Pigment Black 7 composition as described in Example 3, and the following components:

| Components | Weight % |
|---|---|
| Flexol ® LOE[a] | 9.5 |
| ERLX 4683[b] | 1.7 |
| Modified Pigment Black 7 | 4.8 |
| Limonene Dioxide | 39 |
| Z-6041[c] | 40 |
| UVI 6974[d] | 5 |

[a]Flexol LOE, available from the Union Carbide Corporation, is an epoxidized linseed Oil (oxobis (1-butane-2, 2-dimethylol);
[b]ERLX 4683 is an experimental product available from the Union Carbide Corporation and is tetrakis (3,4-epoxycyclohexane-carboxylate); and
[c]Z-6041 is an experimental product available from Dow Corning and is glycidoxy-ethoxy silane. UVI 6974, available from the Union Carbide Corporation, is triarylsulphonium hexafluoroantimonate.

The Flexol LOE, the ERLX 4683 and the modified Pigment Black 7 were mixed together in a ratio of 20 parts of Flexol LOE, 3.5 parts of ERLX 4683 and 10 parts of modified Pigment Black 7. After processing, the remaining components were added slowly at low mixing speed. The resulting ink was subjected to the same set of physical tests as in Example 3.

The 25° C. viscosity at 100 s$^{-1}$ was 7.5 mpa·s, which is fine for several ink jet heads. The thermal stability was good. Optical microscopy showed a very fine dispersion with no particles above one micron.

Draw downs were done on aluminum foil and corona treated polyethylene with a #3 Meyer Rod. The resulting ink lays were cured at 200 fpm, with 2 lamps having an output of 300 Watts/inch in the UV spectral region and a cylindrical reflector. The cured ink lays exhibited good adhesion, good resistance to water and good scratch resistance on both substrates.

EXAMPLE 8

A UV curable ink jet ink formulation was formulated using a modified Pigment Yellow 12 composition. Modified Pigment Yellow 12 composition containing Pigment Yellow 12 and rheological additive was prepared as described in Example III of U.S. Pat. No. 5,062,894. A mixture of 16.5 parts of isatoic anhydride (96% pure) and 220 parts of a primary amine-terminated poly (ethylene oxide/propylene oxide) (70/30) copolymer having a number average molecular weight of approximately 2,000 (available from the Huntsmann Corporation) was stirred and heated gradually to 80° C. until evolution of $CO_2$ ceased. The infrared spectrum indicated that the isatoic anhydride had completely reacted as evidenced by the disappearance of the characteristic anhydride absorptions at 1749 $cm^{-1}$. Thereafter, 16.5 parts of t-butyl acetoacetate were added and the reaction mixture was heated at 95° C. and stirred for 8 hours to form Agent 1. Tetrazotized 3,3' O-dichlorobenzidine (DCB) was then prepared by adding 21.7 parts DCB to 39.8 parts of 200 Be hydrochloric acid and 140 parts of ice/water mixture with constant stirring to form a homogenous suspension. 32.6 parts of a 38% solution of sodium nitrite was added to the suspension and stirring was continued for 1 hour 0–3° C. The excess nitrous acid was then destroyed by the addition of approximately 0.5 part sulfamic acid. A fine suspension of coupler was prepared by charging 31.1 parts acetoacetanilide and 0.5 part phenylmethyl pyrazolone (a shading agent) to 400 parts water and 33.6 parts of 50% sodium hydroxide. The mixture was stirred until all solids were dissolved, then the temperature was adjusted between 0 and 5° C. and thereafter the coupler was precipitated by slowly adding 36.2 parts of 70% acetic acid. Immediately prior to coupling, 20.6 parts of Agent 1 were added to the coupler suspension as stirring was maintained throughout coupler preparation and reaction. Coupling was then carried out by adding the solution of tetrazotized DCB to the fine suspension of coupler over a 40 minute period while stirring until no excess tetrazotized DCB remained. Then the temperature was increased to 40° C. The resulting pigment slurry was stirred an additional 30 minutes, filtered, washed and dried in an oven at 75° C. (Yield 69 parts of Modified Pigment Yellow 12 composition containing Pigment Yellow 12 and rheological additive). Next, the following components:

| Components | Weight % |
|---|---|
| Cyracure ® 6105[a] | 30 |
| Modified Pigment Yellow 12 | 5 |
| Z-6040[b] | 60 |
| UVI 6974[c] | 5 |

[a]Cyracure 6105, available from the Union Carbide Corporation, is 3,4epoxycyclohexylmethyl-3, 4 epoxycyclohexylcarboxylate;
[b]Z-6040, available from Dow Corning, is glycidoxy-methoxy silane; and
[c]UVI 6974, available from the Union Carbide Corporation, is triarylsulphonium hexafluoroantimonate.

The Cyracure 6105 and the modified Pigment Yellow 12 were mixed together in a ratio of 3:1. After processing, the remaining components were added slowly at low mixing speed. The resulting ink was subjected to the same set of physical tests as in Example 3.

The 25° C. viscosity at 100 $s^{-1}$ was 12 mpa·s, which is fine for several Ink Jet heads. The thermal stability was good up to 50° C. Optical microscopy showed a very fine dispersion with no particles above one micron.

Draw downs were done on aluminum foil and corona treated liolyethylene with a #3 Meyer Rod. The resulting ink lays were cured at 200 fpm, with 2 lamps having an output of 300 Watts/inch in the UV spectral region and a cylindrical reflector. The cured ink lays exhibited good adhesion, good resistance to water and good scratch resistance on both substrates.

EXAMPLE 9

A thermal curable ink jet ink formulation was formulated using a modified Pigment Black 7 composition according to Example 3, and the following components:

| Components | Weight % |
|---|---|
| Cyracure ® 6105[a] | 14 |
| Modified Pigment Black 7 | 6 |
| Limonene Dioxide | 75 |
| TLC 14-12[b] | 2.5 |
| Propylene Carbonate | 2.5 |

[a]Cyracure 6105, available from the Union Carbide Corporation, is 3,4epoxycyclohexylmethyl-3, 4 epoxycyclohexylcarboxylate; and
[b]TLC 14-12, experimental product available from King Industries, is a blocked acid.

The Cyracure 6105 and the modified Pigment Black 7 were mixed together in a ratio of 3 to 1. The thermal initiator, TLC 14–12, was dissolved in Propylene Carbonate in a ratio of 1:1. After processing, the Limonene Dioxide was added slowly at low mixing speed, followed shortly by the addition of the thermal initiator solution. The resulting ink was subjected to the same set of physical tests as in Example 3, except the thermal stability test.

The 25° C. viscosity at 100 $s^{-1}$ was 14 mpa·s, which is fine for several ink jet heads. Optical microscopy showed a very fine dispersion with no particles above one micron.

Draw downs were done on aluminum foil and on coated paper with a #3 Meyer Rod. The resulting ink lays were cured in an oven at 140° C. for 45 s or 160° C. for 15 s. The cured ink lays exhibited good adhesion, good resistance to water and good scratch resistance on both substrates.

The ink jet ink was filled in the DOD printer head and jetted at room temperature onto a coated paper, a film and aluminum foil. The ink jetted fine and dot addressability was excellent. The resulting printed substrates were cured under the same conditions as the draw downs and exhibited the same resistance properties.

EXAMPLE 10

A thermal curable ink jet ink formulation was formulated using a modified Pigment Black 7 composition according to Example 3, and the following components:

| Components | Weight % |
|---|---|
| Cyracure ® 6105[a] | 14 |
| Modified Pigment Black 7 | 6 |
| Limonene Dioxide | 75 |
| FC-520[b] | 5 |

[a]Cyracure 6105, available from the Union Carbide Corporation, is 3,4epoxycyclohexylmethyl-3, 4 epoxy-cyclohexylcarboxylate; and
[b]FC-520, available from 3M, is a blocked fluoroaliphatic acid salt.

The Cyracure 6105 and the modified pigment black 7 were mixed together in a ratio of 3:1. After processing, the Limonene Dioxide was added slowly at low mixing speed, followed shortly by the addition of the FC-520 thermal initiator. The resulting ink was subjected to physical testing. The 25° C. viscosity at 100 $s^{-1}$ was 14 mpa·s, which is fine for several ink jet heads. Optical microscopy showed a very fine dispersion with no particles above one micron.

Draw downs were done on aluminum foil and on coated paper with a #3 Meyer Rod. The resulting ink lays were cured in an oven at 140° C. for 60 s or 160° C. for 30 s. The cured ink lays exhibited good adhesion, good resistance to water and good scratch resistance on both substrates.

EXAMPLE 11

A thermal curable ink jet ink formulation was formulated using a modified Pigment Black 7 composition according to Example 3, and the following components:

| Components | Weight % |
|---|---|
| Cyracure ® 6105[a] | 24 |
| Modified Pigment Black 7 | 6 |
| Z-6040[b] | 65 |
| TLC 14-12[c] | 2.5 |
| Propylene Carbonate | 2.5 |

[a]Cyracure 6105, available from the Union Carbide Corporation, is 3,4epoxycyclohexylmethyl-3, 4 epoxy-cyclohexylcarboxylate;
[b]Z-6040, available from Dow Corning, is glycidoxy-methoxy silane; and
[c]TLC 1412, experimental product available from King Industries, is a blocked acid.

The Cyracure 6105 and the modified Pigment Black 7 were mixed together in a ratio of 4 to 6. The thermal initiator, TLC 1412, was dissolved in propylene carbonate in a ratio of 1:1. After processing, the remaining Cyracure 6105 and the Z-6040 were added slowly added at low mixing speed, followed shortly by the addition of the thermal initiator solution. The resulting ink was subjected to physical testing. The 25° C. viscosity at 100 s$^{-1}$ was 10 mpa·s, which is fine for several Ink Jet heads. Optical microscopy showed a very fine dispersion with no particles above one micron.

Draw downs were done on aluminum foil and on coated paper with a #3 Meyer Rod. The resulting ink lays were cured in an oven at 160° C. for 15 s. The cured ink lays exhibited good adhesion, good resistance to water and good scratch resistance on both substrates.

EXAMPLE 12

A thermal curable ink jet ink formulation was formulated using a modified Pigment Black 7 composition according to Example 3, and the following components:

| Components | Weight % |
|---|---|
| Siloxane S-200[a] | 14 |
| Modified Pigment Black 7 | 6 |
| Z-6040[b] | 75 |
| TLC 14-12[c] | 2.5 |
| Propylene Carbonate | 2.5 |

[a]Siloxane S-200 experimental product available from Rhone-Poulenc, 1,3Bis(2-(7-oxabicyclo(4.1.0) hept-3-yl)ethyl)-1,1,3,3-tetramethyldisiloxane;
[b]Z-6040, available from Dow Corning, is glycidoxy-methoxy silane; and
[c]TLC 1412, experimental product available from King Industries, is a blocked acid.

The Silane S-200 and the modified Pigment Black 7 were mixed together in a ratio of 4:6. The thermal initiator, TLC 14-12, was dissolved in Propylene Carbonate in a ratio of 1:1. After processing, the remaining Cyracure 6105 and the Z-6040 were added slowly at low mixing speed, followed shortly by the addition of the thermal initiator solution. The resulting ink was subjected to physical testing. The 25° C. viscosity at 100 s$^{-1}$ was 5 mPa·s, which is fine for several ink jet heads. Optical microscopy showed a very fine dispersion with no particles above one micron.

Draw downs were done on aluminum foil and on coated paper with #3 Meyer Rod. The resulting ink lays were cured in an oven at 160° C. for 15 s. The cured ink lays exhibited good adhesion, good resistance to water and good scratch resistance on both substrates.

The ink was filled in the DOD printer head and jetted at room temperature onto a coated paper and aluminum foil. The ink jetted fine and dot addressability was excellent.

Tables I, II and III summarize the formulations and resulting physical properties for ink jet inks prepared according to a few Examples and other ink jet inks prepared in accordance with the present invention. The inks were jetted onto coated paper substrates.

Those skilled in the art having the benefit of the teachings of the present invention as hereinabove set forth, can effect numerous modifications thereto. These modifications are to be construed as being encompassed within the scope of the present invention as set forth in the appended claims.

TABLE 1

| | | | Examples | | | | | |
|---|---|---|---|---|---|---|---|---|
| Component | Description | Supplier | 13 | 6 | 3 | 4 | 7 | 14 |
| Modified Black | Pigment | Sun Chemical | 6 0 | 5 9 | 5 0 | | 4 8 | 4 8 |
| Modified Blue | Pigment | Sun Chemical | | | | 5 1 | | |
| Cyracure 6105 | Di-Cyclo-Aliphatic Epoxy | Union Carbide | 14 0 | 18 6 | 15 0 | 11 9 | | |
| LDO | Lemonene Dioxide | Elf Alochem | | | 75 0 | 78 0 | 39 0 | 79 0 |
| Z-6040 | Glycidoxy-methoxy silane | Dow Corning | 75 0 | 70 5 | | | | |
| Z-6041 | Glycidoxy-ethoxy silane | Dow Corning | | | | | 40 0 | |
| Flexol LOE | Epoxidized Linseed Oil | Union Carbide | | | | | 9 5 | 9 5 |
| ERLX 4683 | Oxobis(1-butane-2,2-dimethyiol) Tetrakis(3,4-epoxycyclohexane-carboxylate) | Union Carbide | | | | | 1 7 | 1 7 |
| UVI 6974 | Tri-aryl Sulphonium Hexafluoro-Antimonate Salt | Union Carbide | 5 0 | 5 0 | 5 0 | 5 0 | 5 0 | 5 0 |
| | | (Total) | 100 0 | 100 0 | 100 0 | 100 0 | 100 0 | 100 0 |

TABLE 1-continued

|  |  |  | Examples | | | | | |
| --- | --- | --- | --- | --- | --- | --- | --- | --- |
| Component | Description | Supplier | 13 | 6 | 3 | 4 | 7 | 14 |
| Physical Property Data |  |  |  |  |  |  |  |  |
| Curing Speed (fpm) on coated paper, with 2 lamps 300 Watts |  |  | >100 | 100 | >200 | >200 | >200 | >200 |
| Viscosity 25° C., 100 s-1 (cps) |  |  | 6.8 | 8.5 | 14 | 13 | 7.5 | 11 |
| Thermal Stability (°C.) |  |  | >80 | >80 | >80 | >80 | >80 | >80 |
| Jettability |  |  | — | — | Excel | — | — | — |
| Pigment dispersion (Optical Microscopy) |  |  | V Good | V Good | V Good | V Good | V Good | V Good |

TABLE II

|  |  |  | Examples | | | | | | |
| --- | --- | --- | --- | --- | --- | --- | --- | --- | --- |
| Component | Description | Supplier | 15 | 16 | 17 | 8 | 5 | 18 | 19 |
| Modified Black | Pigment | Sun Chemical | 10.8 |  | 6.0 |  | 6.0 | 6.0 | 6.0 |
| Modified Yellow | Pigment | Sun Chemical |  | 4.0 |  | 5.0 |  |  |  |
| Modified Blue | Pigment | Sun Chemical |  |  |  |  |  |  |  |
| Cyracure 6105 | Di-Cyclo-Aliphatic Epoxy | Union Carbide | 7.2 | 12.0 | 24.0 | 30.0 |  |  |  |
| LDO | Lemonene Dioxide | Elf Alochem | 77.0 | 79.6 | 65.0 |  |  |  |  |
| Z-6040 | Glycidoxy-methoxy silane | Dow Corning |  |  |  | 60.0 | 75.0 | 60.0 | 80.0 |
| Siloxane S-200 | 1,3-Bis(2-(7-oxabicyclo(4 1 0) hept-3-yl)ethyl)-1,1,3,3-tetramethyldisiloxane | Rhone Poulenc |  |  |  |  | 14.0 | 29.0 | 9.0 |
| BYK 361 | Surfactant | BYK Chemie |  | 0.4 |  |  |  |  |  |
| UVI 6974 | Triaryl Sulphonium Hexafluoro-Antimonate Salt | Union Carbide | 5.0 | 4.0 | 5.0 | 5.0 | 5.0 | 5.0 | 5.0 |
|  |  | (Total) | 100.0 | 100.0 | 100.0 | 100.0 | 100.0 | 100.0 | 100.0 |
| Physical Property Data |  |  |  |  |  |  |  |  |  |
| Curing Speed (fpm) on coated paper, with 2 lamps 300 Watts |  |  | >200 | >200 | >200 | >200 | >100 | >100 | >100 |
| Viscosity @ 25° C., 100 s-1 (cps) |  |  | 18 | 17 | 13 | 12 | 5 |  | 4 |
| Surface Tension (mN/m) |  |  | 35.5 | 34 | 34.9 | — | — | — | — |
| Thermal Stability (°C.) |  |  | >80 | 38 | >80 | 52 | >80 | >80 | >80 |
| Jettability |  |  | — | — | — | — | Excel | — | — |
| Pigment dispersion (Optical Microscopy) |  |  | V Good | Good | V Good | V Good | V Good | V Good | V Good |

TABLE III

|  |  |  | Examples | | | |
| --- | --- | --- | --- | --- | --- | --- |
| Component | Description | Supplier | 10 | 9 | 11 | 12 |
| High Perf Black 7 | Pigment | Sun Chemical | 6.0 | 6.0 | 6.0 | 6.0 |
| Cyracure 6105 | Di-Cyclo-Aliphatic Epoxy | Union Carbide | 14.0 | 14.0 | 24.0 |  |
| LDO | Lemonene Dioxide | Elf Atochem | 75.0 | 75.0 |  |  |
| Z-6040 | Glycidoxy-methoxy | Dow Corning |  |  | 65.0 | 75.0 |
| Siloxane S-200 | 1,3 Bis(2-(7-oxabicyclo(4 1 0) hept-3-yl)ethyl)-1,1,3,3-tetramethyldisiloxane | Rhone Poulenc |  |  |  | 14.0 |
| TLC-1412 | Sulphonium Salt | King |  | 2.5 | 2.5 | 2.5 |
| Propylene Carbonatte | Propylene Carbonatte | Texaco |  | 2.5 | 2.5 | 2.5 |
| FC-520 | Fluoroaliphatic acid salt | 3M | 5.0 |  |  |  |
|  |  | (Total) | 100.0 | 100.0 | 100.0 | 100.0 |
| Physical Property Data |  |  |  |  |  |  |
| Curing Temperature (°C.) |  |  | 160 | 140 | 160 | 160 |
| Curing time (s) |  |  | 30 | 30 | 15 | 60 |
| Viscosity 25° C., 100 s-1 (cps) |  |  | — | — | 10 | 5 |
| Jettability |  |  | — | — | — | Excel |
| Pigment dispersion (Optical Microscopy) |  |  | V Good | V Good | V Good | V Good |

What is claimed is:

1. An energy curable gravure ink consisting essentially of: a pigment; a rheological additive having the structure:

$$P-(U-Y)_s$$

wherein P is the residue of an organic colorant, Y is a polyalkylene oxide moiety, U is a linking moiety covalently bonding Y to P, and S is an integer from 1 to 3 and; an energy curable liquid vehicle; wherein the ink is substantially free of fugitive solvent and has a viscosity ranging from about 3 cps to about 50 cps.

2. The ink of claim 1 wherein the polyalkylene oxide moiety is an ethylene oxide polymer.

3. The ink of claim 1 wherein the polyalkylene oxide moiety is an ethylene oxide/propylene oxide copolymer.

4. The ink of claim 3 wherein the copolymer has the general formula:

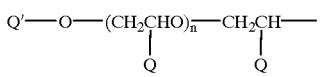

wherein n is about 4 to about 400; Q is H, $CH_3$ or a combination thereof; and Q' is a $C_1$–$C_6$ alkyl moiety.

5. The ink of claim 4 wherein n is about 4 to 60.

6. The ink of claim 1 wherein P is a residue of an azo pigment, phthalocyanine pigment, dioxazine pigment, quinacridone pigment, perylene pigment, or perinone pigment.

7. The ink of claim 1 wherein U is a covalent bond, or a multivalent moiety selected from the group consisting of $C_1$–$C_6$ alkyl, —$NHSO_2$—, —O—, —CO—, —COO—, —N=, and —CONH—.

8. The ink of claim 1 where s has the value 1 or 2.

9. The ink of claim 1 wherein the rheological additive is an azomethine having the general formula:

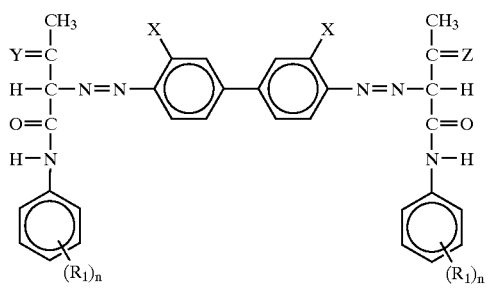

wherein Y is the alkylene oxide polymer containing about 200 groups; R and $R_1$ are independently selected from the group consisting of H, $CH_3$, $OCH_3$, $OCH_2CH_3$, and Cl; n is an integer from 1 to 5; X is selected from the group consisting of Cl, $CH_3$, and $OCH_3$; and Z is selected from the group consisting of O and N—Y.

10. The ink of claim 1 wherein the additive is a azomethine having the general formula:

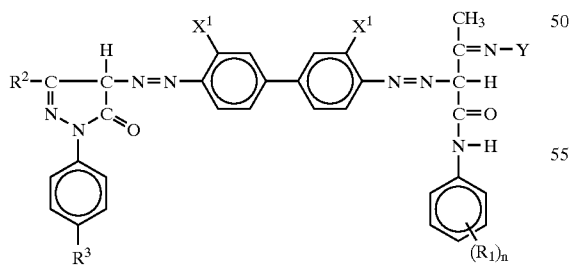

wherein Y is the polyalkylene oxide polymer containing about 4 to about 20 repeat units; $R^1$ is H, $CH_3$, $OCH_3$, $OCH_2CH_3$, or Cl; n is an integer from 1 to 5; $R_2$ is $CH_3$ or $COOCH_2CH_3$; $R_3$ is H or $CH_3$, and $X^1$ is Cl or $OCR_3$.

11. The ink of claim 1 wherein the additive is a diarylide having the general formula:

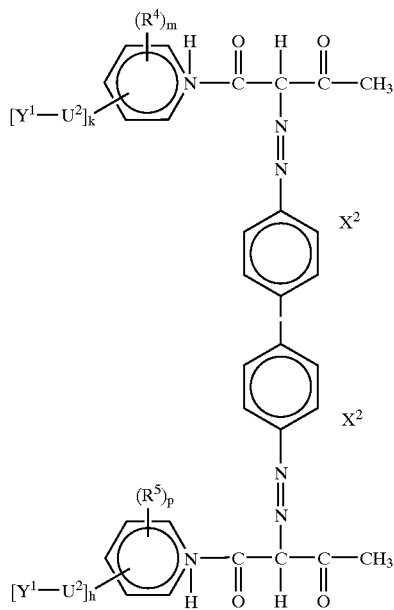

wherein: $R^4$ and $R^5$ are independently selected from the group consisting of $C_1$–$C_4$-alkyl, $C_1$–$C_4$-alkoxy, and halogen; m and p are independent integers of 0 to 5; X2 is selected from the group consisting of Cl, $CH_3$, and $OCH_3$; U2 comprises a divalent bridging moiety selected from the group consisting of $C_1$–$C_6$ alkyl, —$NESQ_2$—, —O—, —CO—, —COO—, and —CONH—; Y1 comprises the polyalkylene oxide moiety having a number average molecular weight of about 200 to 10,000; and k and l are independent integers of 0 or 1, with the proviso that for at least 50 wt % of the pigment composition, k and l are both equal to 0, and for at least 3 wt % of the pigment composition, k and/or l are equal to 1.

12. The ink of claim 1 wherein the additive is an azomethine having the general formula:

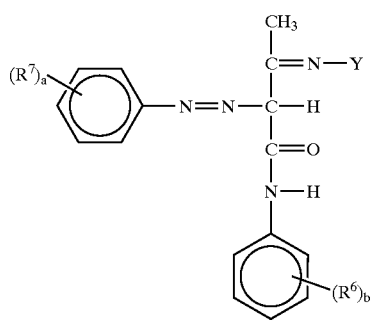

wherein Y is the polyalkylene oxide polymer containing about 4 to about 20 repeat units; $R^6$ is independently selected from the group consisting of Cl, $OCH_3$, $CH_3$, $OC_2H_5$, $C_2H_5$, and $CONH_2$; $R^7$ is independently selected from the group consisting of Cl, $OCH_{13}$, $OH_3$, $NO_2$, $OC_2H_5$, $C_2H_2$, $CONH_2$, $SO_3H$, OH, and COOH; and a and b are independent integers of 0 to 5.

13. The ink of claim 1 wherein the additive is a phthalocyanine having the general formula:

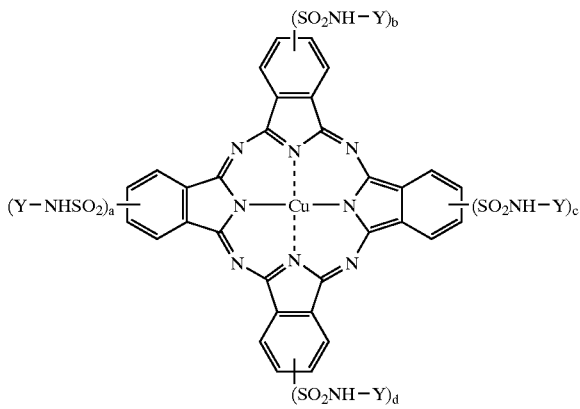

wherein Y has the general formula:

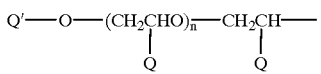

to wherein n is about 4 to about 400, and a, b, c and d are integers independently from about 0 to about 4, provided at least one of them is 1; Q is H, $CH_3$ or a combination thereof; and Q' is a $C_{1-C6}$ alkyl moiety.

14. The ink of claim 1 wherein the pigment is selected from the group consisting of Pigment Yellow 1, Pigment Yellow 3, Pigment Yellow 12, Pigment Yellow 13,Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23, and Pigment Black 7.

15. The ink of claim 1 wherein the pigment is distinct from P.

16. The ink of claim 1 wherein the pigment is the same as P.

17. The ink of claim 16 wherein the ink contains an additional distinct pigment.

18. The ink of claim 1 wherein the energy curable liquid vehicle is a ring opening polymerizable composition.

19. The ink of claim 18 wherein the polymerizable composition is a cationic polymerizable system comprising one or more mono-functional and/or multi-functional epoxide monomers.

20. The ink of claim 19 wherein the cationic polymerizable composition comprises a cycloaliphatic epoxide.

21. The ink of claim 20 wherein the cycloaliphatic epoxide is selected from the group consisting of 3,4-epoxycyclohexylmethyl 3,4-epoxycyclohexylcarboxylate and 1,3-bis(2-(7-oxabicy-clo(4.1.0)hepta-3-yl)ethyl)-1,1,3,3-tetramethyldi-siloxane.

22. The ink of claim 19 wherein the cationic polymerizable composition comprises a non-cycloaliphatic epoxide.

23. The ink of claim 22 Wherein the non-cycloaliphatic epoxide is selected from the group consisting of glycidoxy-methoxy silane and glycidoxy-ethoxy silane.

24. The ink of claim 18 further comprising a polymerization initiating system activatable by actinic radiation.

25. The ink of claim 24 wherein the polymerization initiating system employs a thermal and cationic initiator.

26. The ink of claim 1 wherein the energy curable liquid vehicle is a free radical addition polymerizable system comprising an ethyleneically unsaturated monofunctional or multi-functional monomer.

27. The ink of claim 26 wherein the ink contains a free radical generating, addition Polymerization initiating system activatable by actinic radiation.

28. The ink of claim 1 wherein the ink contains a surface active agent, a wax, or a combination thereof.

29. A method of gravure printing and curing a gravure ink composition comprising the steps of:

(a) preparing an energy curable gravure ink consisting essentially of: a pigment and a rheological additive of the structure:

wherein P is the residue of an organic colorant, Y is a polyalkylene oxide moiety, U is a linking moiety covalently bonding Y to P, and S is an integer from 1 to 3 and; an energy curable liquid vehicle; wherein the ink is substantially free of fugitive solvent and has a viscosity ranging from about 3 cps to about 50 cps;

(b) printing the ink on a substrate surface to form an image; and c) subjecting the image to actinic radiation or thermal energy to form a cured image.

30. The method of claim 29 wherein the actinic radiation is a beam of electrons.

31. The method of claim 29 wherein the energy curable ink contains a polymerization initiating system activatable by actinic radiation, and wherein the actinic radiation is ultraviolet radiation.

32. The method of claim 29 wherein the image is initially subjected to ultraviolet radiation and subsequently subjected to a beam of electrons or thermal energy.

33. The method of claim 29 wherein the thermal energy is radiant or conductive thermal energy.

* * * * *